United States Patent [19]
Gulley

[11] 3,953,661
[45] Apr. 27, 1976

[54] EXTRUSION APPARATUS, PROCESS AND ARTICLE
[75] Inventor: Willard Q. Gulley, Concord, Tenn.
[73] Assignee: Vinylex Corporation, Knoxville, Tenn.
[22] Filed: Jan. 3, 1974
[21] Appl. No.: 430,487

[52] U.S. Cl. ............................ 428/542; 52/99; 52/100; 52/403; 52/573; 156/344; 428/167; 428/168; 428/212; 428/217; 428/218; 428/323
[51] Int. Cl.² ..................... B32B 7/00; B32B 3/30
[58] Field of Search ........... 161/162, 252, 166, 406; 264/211, 177 R, 171; 156/289, 71, 344; 428/43, 323, 329, 330, 331, 328, 212, 542, 217, 218, 167, 168; 52/99, 100, 573, 403

[56] References Cited
UNITED STATES PATENTS

| | | | |
|---|---|---|---|
| 2,940,196 | 6/1960 | Schor | 161/406 |
| 3,330,187 | 7/1967 | Kohler et al. | 264/177 R |
| 3,476,627 | 11/1969 | Squires | 264/171 |
| 3,535,409 | 10/1970 | Rohde | 264/171 |
| 3,565,738 | 2/1971 | Kirkpatrick | 161/252 |
| 3,655,503 | 4/1972 | Stanley et al. | 161/252 |
| 3,783,089 | 1/1974 | Hurst et al. | 161/166 |

Primary Examiner—Harold Ansher
Assistant Examiner—Stanley S. Silverman
Attorney, Agent, or Firm—Mason, Fenwick & Lawrence

[57] ABSTRACT

A unitary extruded thermoplastic article that may be a concrete joint former having an intermediate tear plane formed from an admixture of a plasticizer or a filler in the amount of 150 to 1500 parts per 100 parts of thermoplastic resin.

A process for producing an extruded article having a strippable top and a lower tear strength intermediate portion including extruding one thermoplastic material into separate spaced strips, extruding another thermoplastic material into the space between the strips and then compressing the strips to form a unitary article.

An extrusion die apparatus for extruding at least two different thermoplastic compositions. A distributing means including a separating means for dividing the thermoplastic flow within the passageway and dispensing a second composition into the divided flow.

A method for reducing the tear strength of a thermoplastic material while retaining adequate tensile strength by incorporating a filler or plasticizer in amounts greater than 150 parts per 100 parts of the thermoplastic.

8 Claims, 14 Drawing Figures

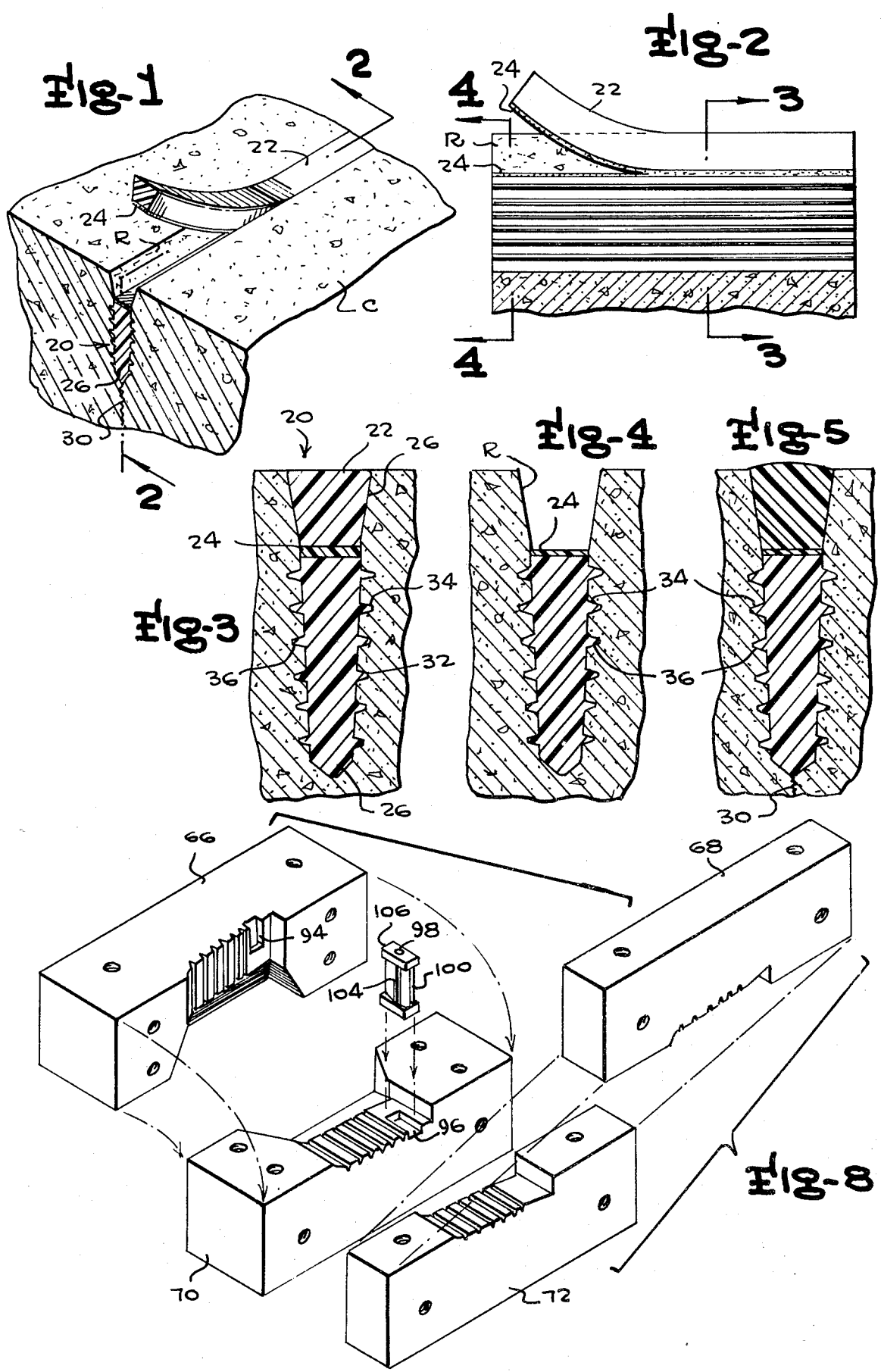

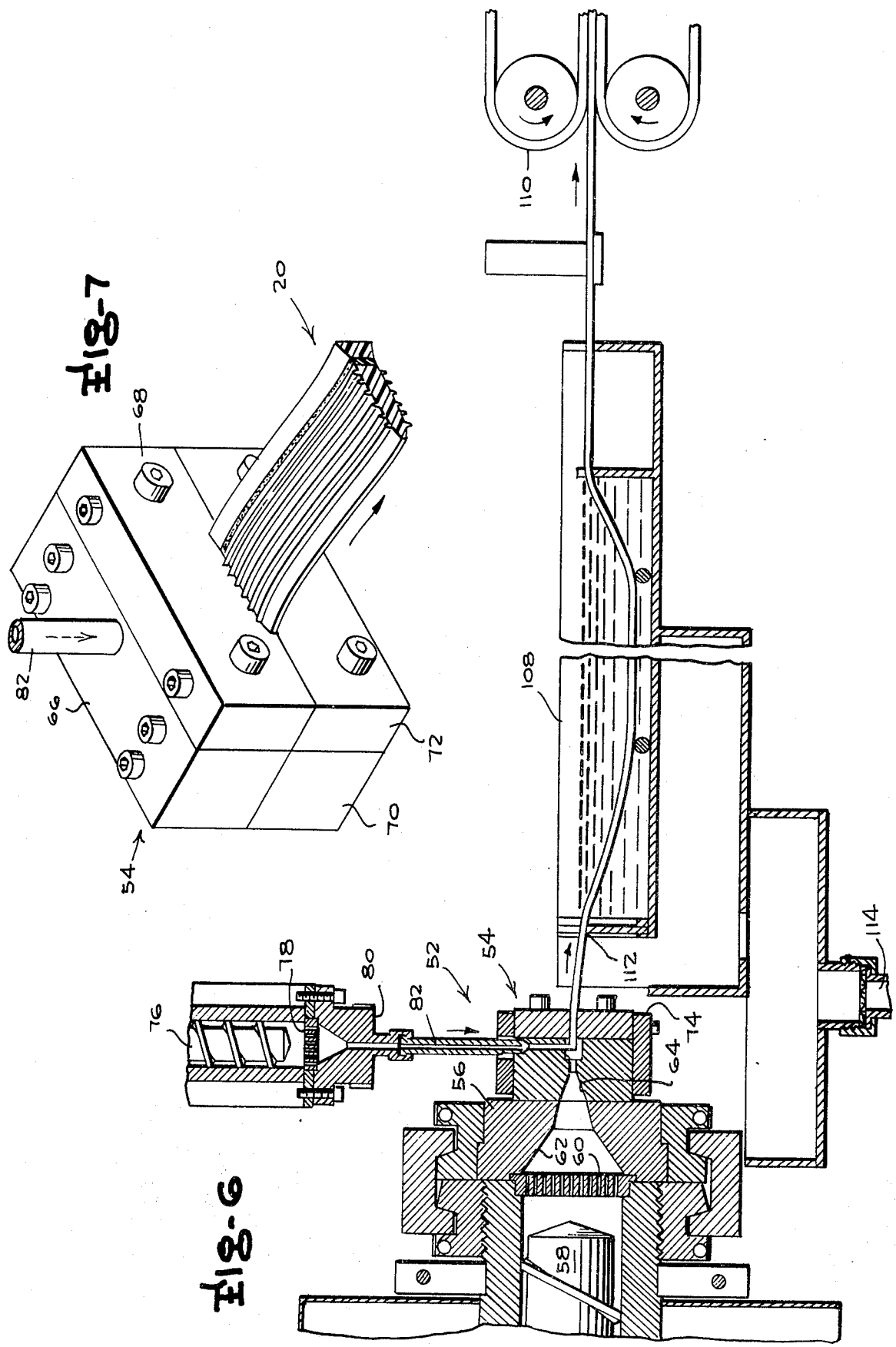

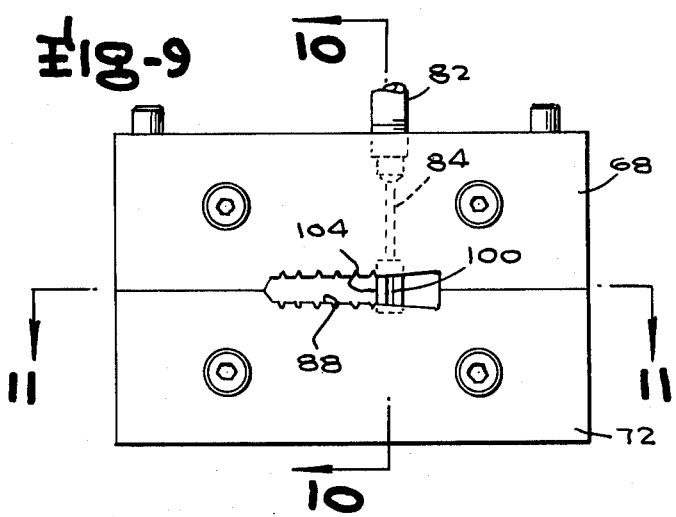
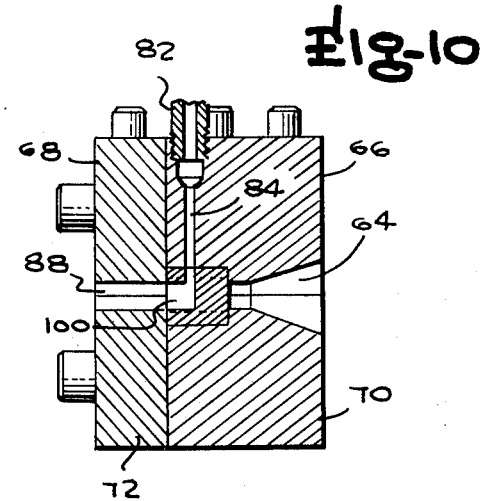
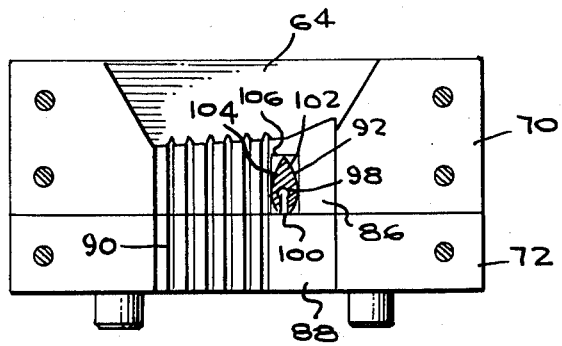
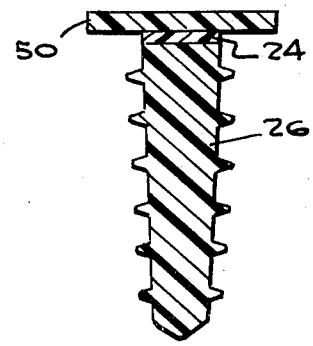
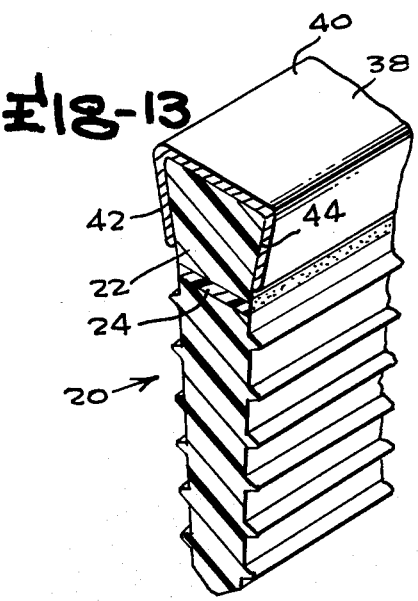
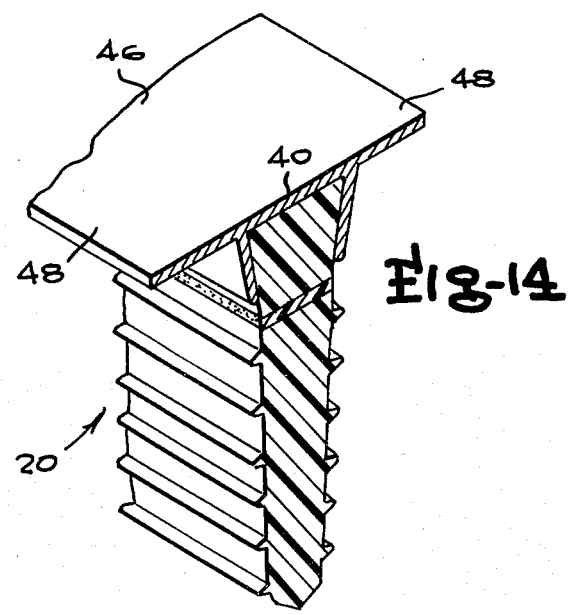

EXTRUSION APPARATUS, PROCESS AND ARTICLE

BACKGROUND OF THE INVENTION

The present invention relates to improvements in plastic articles and methods and apparatus for extruding such articles. More particularly, the present invention relates to an extruding apparatus and extrusion method for making a novel composite extruded article formed from a plurality of compositions and having a strippable or separable portion.

The present invention relates most particularly to the field of extruded articles including the apparatus and process for making them in which a stable article is produced which will not inadvertently be separated, but which posseses an intermediate portion forming a weakened tear plane permitting the top and bottom portions of the extruded article to be separated by tearing. Articles of these physical characteristics have application to a number of commercial embodiments, but for brevity this disclosure will describe one important use of such an extruded article.

Joint formers are well known to be useful in the construction of elongated concrete masses. The primary purpose of a joint former is to form what is known as a plane of weakness in the concrete upon setting which permits or causes the concrete to crack or fracture in a controlled manner along the plane of the joint former. The joint former also may create or permit the formation of a recess in the concrete which will receive caulking material for the formation of a seal to prevent surface waters from entering the joint. Kohler U.S. Pat. No. 3,330,187 describes in some detail various joint formers and their use.

Joint formers of the type disclosed in the patent have been found to create physical stability problems which often times render such a joint former inoperative for its proposed purpose. The stability of the product produced depends upon the contact between the two separate extrusions that are brought into contact with each other while in the hot molten plastic state to permit a limited weld before the joined extrusions enter the cooling medium. Since the tensile strength of the material, is in the order of 2000 psi, it is evident that the distance between the point of contact of the two hot extrusions, the entry into the cooling medium, and the pressure with which they are brought together are very critical. If the weld is too good, or covers too much area, it is evident that it would be very difficult to separate the sections after the product has been installed and the concrete has hardened. On the other hand, if the weld is inadequate, the two elements may be so unstable as to become separated during shipment, storage, or installation.

The limited area of contact between the two elements causes the upper section to rock or tilt as it is being installed. This instability can make proper installation more difficult. The actual nature of the extrusion process contributes to the tendency of the upper section of the joint former to rock or tilt with respect to the bottom section. The plastic material as it emerges from the two orifices in the die has a tendency to "swell", due to plastic memory, with the result that the two surfaces, as they are brought together for the weld, are slightly convex with respect to each other which results in a "line" weld in much the same manner as two pieces of pipe, brought together side by side, would only establish line contact.

Alternate constructions are known wheren two thin webs would connect the upper and lower sections to enclose an empty space. From experience it is known, that as a practical matter, these webs must be on the order of 3/64 inch thick. If the webs were much thinner, the connection between the upper and lower sections would not be stable with respect to each other. Since the material which comprises the embedded lower section of the former must be of high quality, it will have a tear strength in the order of 325 lbs. or more per inch of width (or thickness). Two webs, 3/64 inch thick, would require a pulling force in the order of 30 or more lbs. in order to tear away the upper section. This task is made even more fatiguing for the person performing it by the fact that the polyvinyl chloride material comprising the webs would have an elongation before rupture in the order of 300 to 400percent. Thus, the task would be somewhat analogous to tearing a sheet of rubber.

Such an alternate design of the joint former would not allow the user the option of leaving the upper section intact in the concrete with the top surface of the upper section flush with the top surface of the concrete. Also, when subjected to such action as would be produced by the skidding or spinning action of the tires of vehicles using the paved surface, the thin connecting webs of this design will stretch allowing the upper section to rise in its recessed groove and eventually be torn away.

OBJECTS OF THE INVENTION

The present invention has as an object the provision of an extrusion die apparatus, method and extruded product having a stable separable stripping portion.

This invention also has as an object the provision of an extrusion die apparatus for extruding at least two different thermoplastic compositions to form a unitary extruded article.

It is also an object of the present invention to provide a process for producing an extruded article having a separable strippable top portion by use of an intermediate portion of lower tear strength.

It is also an object of the present invention to effect the lowering of the tear strength of an extruded article along a preselected tear plane while retaining adequate tensile strength.

A more particular object of the present invention is to provide an improved joint former for use in controlling the cracking or fracturing of elongated masses of concrete and which is provided with a top portion that can be torn or stripped away from a bottom portion to define a recess in the concrete that may be caulked with filling or sealing composition.

It is also an object of the present invention to provide a joint former which may be installed in a concrete mass without removal of the top portion and which is flexible in nature so that it may be formed in rolls of continuous length prior to installation.

It is also an object of the present invention to provide a joint former combined with a reusable rigid member attached to the top portion to facilitate the installation of the joint former along a preselected path.

It is also a further object of the present invention to provide a process for manufacture of a composite flexible joint former having a separable top portion which may be torn away along an intermediate portion that forms a tear plane having substantially lower tear strength and yet, is sufficiently strong and rugged to avoid accidental separation during conventional handling and transportation prior to installation in the concrete mass.

A further object of the present invention is the provision of a method of reducing the tear strength of a thermoplastic composition while retaining adequate tensile strength through the use of a plasticizer for the thermoplastic material or a filler.

These an other objects of the present invention will become readily apparent upon careful consideration of the following specification, claims and drawings.

THE DRAWINGS

FIG. 1 is a cross-sectional perspective view partly broken away illustrating the joint former of the present invention embedded in a mass of concrete and the top portion being stripped away to leave a reaces to be caulked.

FIG. 2 is a elevational view partly broken away taken along lines 2—2 of FIG. 1.

FIG. 3 is a view taken along lines 3—3 of FIG. 2 illustrating the joint former of the present invention embedded in the mass of concrete.

FIG. 4 is a cross-sectional view partly broken away taken along lines 4—4 of FIG. 2 illustrating the top portion of the joint former of the present invention being torn away leaving the recess.

FIG. 5 is a view similar to that of FIG. 4 but illustrating the recess being filled with conventional caulking.

FIG. 6 is a schematic cross-sectional view partly broken away of the extrusion die apparatus of the present invention illustrating the dual extrusion machines directing differing thermoplastic compositions into the die.

FIG. 7 is a perspective view of the extruded joint former as it emerges from the die.

FIG. 8 is an exploded perspective view of the die illustrating the unique distributing means and separating means positioned within the die passageway.

FIG. 9 is a front elevational view of the die of FIG. 7 prior to extrusion.

FIG. 10 is a cross-sectional view taken along lines 10—10 of FIG. 9 illustrating the positioning of the distributing means along the die passageway.

FIG. 11 is a cross-sectional view taken along lines 11—11 of FIG. 9 illustrating the shape of the distributing and separating means.

FIG. 12 is a cross-sectional view of an alternate embodiment of the joint former.

FIG. 13 is a perspective view of a cross-section of a joint former of the present invention provided with the optional rigid channel covering the top portion.

FIG. 14 is a perspective cross-sectional view of the joint former of the present invention illustrating an alternate embodiment of the reusable rigid channel member shown in FIG. 13.

DESCRIPTION OF ILLUSTRATIVE EMBODIMENT

The Extruded Article.

FIGS. 1 through 5 and 12 through 14 illustrate the joint former of the present invention. It is to be understood that the shape of the illustrated article in the form of the joint former is merely representative of a number of extruded articles that may be produced having a variety of uses necessitating at least the common characteristic of having an extruded article with stable proportions and a portion that is tearable or strippable along a preformed tear plane.

The joint former of the present invention is shown at 20 and is composed of a top portion 22, an intermediate portion 24 and an elongated substantially triangular shaped bottom portion 26.

The top portion is shown in cross-section in the form of a trapezoid having smooth sides 26 produced from the die extrusion and is coextensive with the intermediate tear plane strip that may be of any particular height or thickness. Generally, the thickness may be anywhere from 0.010 inches which is an approximate minimum in order to obtain an even and uniform application between the top and bottom portions and a thickness of approximately one-eighth of an inch. The preferred thicknesses in the order of 1/32 to 1/16 inches are also found to be adequate. If the intermediate portion is too thick the stripping of the top portion often results in a rough irregular residue being alternately left on the bottom of the top portion and on the top of the bottom portion. Generally, it is preferred to have the intermediate portion coextensive with the top and bottom portions.

The joint former body including the top intermediate and bottom portions is extruded into a long continuous strip for embedment into the mass of concrete C usually when the concrete is in a plastic condition. By reason of the length of the joint former, the cracking or fracturing line 30 will be formed to achieve the basic purpose of the joint former.

On each side of the bottom portion a plurality of longitudinally extending ribs 32 are positioned to act as a barrier or seal to the water on the surface of the concrete and prevent it from passing down into the fracture line 30. Each of these ribs is provided with an upper and lower sloping surface 34 and 36 respectively which are angled outwardly towards each other on a converging angle. The sloping and converging upper and lower surfaces or faces perform with unusual efficiency the important requirement of preventing the passage of water around the joint former particularly when the embedded joint former is under stress. It has been found that the joint former acts upon shifting of the mass of concrete on one side of the joint former to wedge with greater force the sloping upper face 34 on the downward shifting side of the concrete and the sloping lower surface 36 on the opposite side to bite more securely into the mating grooves in the concrete forming a wedge like action that actually improves the resistance to the passage of water.

These ribs are essential to retain the joint formed in the concrete after hardening.

The joint formers found useful in the past have been of uniform composition. The formation of the tear plane to permit the removal of the top portion has been found, in accordance with the present invention, to require a different composition from the top and bottom portions. It has been discovered that the tear strength may be substantially reduced in a selected area while the tensile strength remains adequate by forming the intermediate layer of section 24 with a tear strength reducing agent in the form of a plasticizer or a common filler.

The body of the joint former is formed of a thermoplastic resin such as polyvinyl chloride, copolymers with vinyl acetate as well as extrudable thermoplastic rubber (TPR), polyethylene and copolymers of ethylene with vinyl acetate.

When polyvinyl chloride or a polyvinyl chloride - vinyl acetate copolymer is used as the thermoplastic resin, the plasticizers that are used are those that are typically known to be useful with such thermoplastics and may include, for instance, various alkyl phthalate esters such as dioctyl phthalate and similar alkyl adipates.

The fillers may be any of the well known clays such as kaolin, diatomaceous earth, silicon dioxide, carbonates, oxides, sulfates and silicates of calcium, aluminum, barium, magnesium and the like. The identity of the filler or the plasticizer is not critical to the present invention. It is however, important that at least 150 parts up to usually 1500 parts per 100 parts of thermoplastic resin be utilized to effect the substantial reduction in the tear strength without a corresponding magnitude of reduction in the tensile strength. The filler is used preferably in amounts between 400 to 800 parts by weight per 100 parts of the thermoplastic resin. Calcium carbonate has been found to be particularly effective and is the preferred filler.

The following table, based on actual tests shows the affect of calcium carbonate filler content on the tear strength and the tensile strength of the joint former made of plasticized polyvinyl chloride. The joint former used was 9/32 inch wide at the intermediate portion 24. The tear strength, the average results of three specimens, was conducted by embedding the joint former specimens in concrete in the usual manner, slitting at the end of the intermediate portion to initiate tear, and measuring the tear strength by means of a Chatillion scale. The tensile strength of the material comprising the intermediate portion of the joint former was determined by separating the top 22 and bottom 26 by the application of a normal tensile force. The ultimate tensile strength is reported on both a lbs./sq. in. basis and on the basis of lbs. of force required to separate specimens 1 inch long. The values given are the average of five test specimens in each case. The polyvinyl chloride compound variable consists of changes in the filler content of the compound in terms of parts by weight of calcium carbonate per 100 parts by weight of polyvinyl chloride (PVC) resin, with such adjustments made in the plasticizer content of the compound as to maintain approximate constant hardness:

| Parts Calcium Carbonate per 100 Parts of PVC Resin | Thickness of Inch. | Tear Strength Lbs. | Tensile Strength 1" Long Specimens Lbs. | Tensile Strength Lbs./Sq. In. |
|---|---|---|---|---|
| 100 | 1/32" | * | 220 | 783 |
| 200 | 1/32" | 48 | 143 | 509 |
| 400 | 1/32" | 19.3 | 101.5 | 362 |
| 400 | 1/16" | 22.3 | 97.5 | 347 |
| 600 | 1/32" | 16.3 | 71 | 263 |
| 800 | 1/32" | 12.3 | 63.2 | 225 |
| 800 | 1/16" | 11.7 | 62.7 | 223 |
| 1,000 | 1/32" | 9.8 | 61 | 217 |

*Tear strength exceeded capacity of Chatillion scale.

It should be noted that a variation in the thickness of the tear plane at the intermediate portion has no material effect upon the tear strength. It is more notable however, that the data supports the conclusion and finding of the present invention that increasing amounts of calcium carbonate filler when added to the compound formulation decreases the tear strength much more rapidly than the tensile strength.

By changing the filler content from 200 parts to 1,000 parts the joint former only retains 20.4 percent of the tear strength of the 200 part formulation; whereas the 1,000 part formulation retains approximately 40.7 percent of the tensile strength of the formulation containing 200 parts filler. This phenomena permits the production of a very rugged joint former as regards accidental separation, yet one that can be easily separated when so desired.

The thermoplastic resin forming the top and bottom portions also contains plasticizer in the usual conventional amount and may also include a nominal amount of filler such as up to about 30 parts of calcium carbonate per 100 parts of polyvinyl resin. The purpose of the filler in such a nominal amount is simply to permit ease of extrusion. The top and bottom portions so formulated and extruded produce a tough and durable product having a typical tensile strength on the order of 2,000 psi, and a tear strength of 325 lbs. or more per inch of thickness. The filler may be omitted from the composition forming the top and bottom portions if so desired.

The following table illustrates the effectiveness of the use of a plasticizer dioctyl phthalate upon the tear strength and the tensile strength of the intermediate portion when either used alone or with a filler such as calcium carbonate.

| Parts Calcium Carbonate per 100 Parts PVC Resin | Parts Plasticizer Per 100 Parts PVC Resin | Tear Strength Lbs. | Tensile Strength 1" Long Specimens Lbs. | Tensile Strength Lbs. Per Sq. In. |
|---|---|---|---|---|
| 0 (X-1339-C) | 155 | 36.3 | 194 | 690 |
| 0 (X-1339-E) | 205 | 29.5 | 119 | 422 |
| 100 (X-1339-D) | 155 | 26.8 | 177 | 631 |
| 200 (X-1339-F) | 205 | 18.6 | 95 | 338 |

It has been found that plasticizer content when utilized alone should be preferably in amount of 150 to 350 parts per 100 parts of resin though, lower and higher amounts within the stated range for filler content are usable.

In utilizing the greater plasticizer content it is preferable not to use the typical suspension type polyvinyl chloride resins which would otherwise yield a very wet powder when mixed prior to extrusion rather, it is more convenient to utilize an emulsion type or plastisol polyvinyl chloride resin having a very fine particle size which when the formulation is mixed yields a pourable liquid formulation that can be readily fed to the extruder.

FIGS. 13 and 14 depict the optional reusable rigid U-shaped channel or cap which in its simplest form as shown in FIG. 13 at 38 is formed of a base 40 and upstanding converging legs 42 and 44 which are designed to fit over the top portion 22 to hold the flexible joint former relatively rigidly as it is being set into the mass of concrete. The rigid cap or channel 38 is designed for use in forming those joints having critical requirements as to direction and as to the top of the joint former being in exactly the same plane as the surface of the concrete. Through the use of the rigid channel 38 fitted over the top portion 22 the joint former may be set accurately within the mass of concrete and after the concrete has set the channel 38 may be removed for reuse while the joint former remains embedded in the concrete. Thereafter, the top portion 22 may be stripped along the intermediate portion 24 forming the tear plane and the recess R filled with conventional caulking.

It is also contemplated that for various uses the channel 38 may be used to meet various decorative designs in the concrete paving and thus may be of various colors for permanently remaining embedded in the concrete mass to form what is often referred to as a feature strip. The rigid channel 38 may be made of any suitable rigid plastic. Typical of the acceptable materials to form the channel is unplasticized polyvinyl chloride.

FIG. 14 depicts an alternate embodiment of a winged channel at 46 having the same base portion 40 and legs 42 and 44 but being provided with horizontally extending wings 48 on each side of the base to form nailing flanges which enable the winged channel 46 to be secured to one of the concrete forms. The wings 48 may be penetrated by nails or screws (not shown) or other suitable means of attaching to the forms which usually are formed from wood. As the concrete forms are removed the winged channel 46 is extracted from the joint former for subsequent reuse. Again the top portion 22 may be permitted to remain in the concrete or stripped.

FIG. 12 is a modification of the joint former of the present invention and is particularly designed for use in long formed vertical walls where the passage of water through the vertical crack is not the significant problem and it is desired to avoid expense of filling a groove in the concrete with an expensive sealing material. As shown, the top portion extends horizontally beyond the sides of the bottom portion, but remains releasably secured to the bottom portion 26 by the tear plane in the form of the intermediate portion 24.

The flat top portion 50 is designed to be attached to the concrete forms by nailing through the top in a manner similar to that previously described in connection with the winged channel 46. The flat top portion 50 may be torn away through the intermediate portion 24 without the necessity of adding caulking material although, it is also contemplated that the joint former may be left intact with the flat top exposed to provide the asthetic rustification line.

EXTRUSION DIE APPARATUS AND METHOD

The extrusion die apparatus of the present invention is shown generally at 52 in FIGS. 6 through 11. As shown in FIG. 6, the extrusion die apparatus includes the die 54, the die base 56 supporting the die 54 in a conventional manner and the extruder 58. Strainer plate 60 is positioned between the extruder 58 and the die base 56. The die base 56 is provided with passageway 62 that communicates with the entrance 64 to the die 54. Preferably, the die 54 is composed of four individual parts construction and disassembly purposes as best shown in FIG. 8. These are the top rear part 66, the top forward part 68, the lower rear part 70 and the front lower part 72. Conventional electrical heating means 74 is provided around the die 54.

Angularly disposed from the path of the extruder 58 of the one composition is another extruder 76 filled with a different composition and having the strainer plate 78 fitted to the die base 80 connected to and in fluid communication with tube 82 for moving the thermoplastic composition into the die 54. The top rearward die 66 is provided with a bore 84 as best shown in FIG. 10 into the die passageway 86. The die passageway 86 includes the entrance 64 and the exit opening 88. The die passageway is suitably conformed to the shape of the extrusion product directed and as shown is formed with grooves 90 to form the ribs 32 on the bottom portion of the joint former. Positioned within the die passageway 86 is a distributing means 92 in the form of an insert as best shown in FIGS. 8 and 11. The insert distributing means 92 is fitted into suitable holding recesses in the upper and lower die parts 66 and 70 as shown in FIG. 8 at 94 and 96. The distributing means insert 92 includes a bore 98 which is in fluid communication with the bore 84 in the die and in the front portion of the insert 92 there is included an elongated dispensing opening 100 in communication with the bore 98. The direction of the dispensing opening 100 is alined axially with the flow of the thermoplastic material extruded in the die and is positioned at the precise lateral location for the formation of the intermediate portion 24 of the joint former.

The distributing means 92 dispenses the thermoplastic material from the extruder 76 out through the dispensing opening 100 into a space provided between the top and bottom portion strips by the unique shape of the distributing means 92.

Downstream of the dispensing opening and located on the distributing means 92 is the separating means 102. The shape of the distributing means 92 as best seen in the FIGS. 8 and 11 is tear drop shaped having a bulbous center portion 104 and a narrowing streamline shape towards the upstream end as shown at 106 in order that the incoming thermoplastic material is separated and divided as it passes through the die entrance 64 where it comes into contact with the distributing means 92. As the thermoplastic composition passes the tapered end 106, the thermoplastic composition is physically separated into individual paths forming separately the top and bottom portions 22 and 24 of the joint former. As the thermoplastic material in separate paths reaches the dispensing opening 100 the second thermoplastic composition is dispensed between the top and bottom portions. Thereafter, as the top intermediate and bottom portions pass downstream of the distributing means insert, the heat and pressure from the forward top and bottom die parts 68 and 72 fuse the three portions together to form an integral unitary extruded article. Thereafter, in conventional fashion, the joint former strip is cooled in a liquid bath 108 while being drawn out by caterpiller tracks 110. The cooling medium in the bath 108 is water that overflows at 112 and down through drain 114.

In the method of the present invention, separate thermoplastic compositions are extruded simultaneously through the extruders 58 and 76 and are passed into the die entrance 64 where the top and bottom portions 22 and 24 respectively of the joint former are formed into separate individual strips as they come in contact with the tapered end 106 of the distributing means 92. The thermoplastic composition from the extruder 76 is dispensed out through the dispensing opening 100 between the separate and individual strips formed by the separating means 102. Thereafter, the three portions are compressed and used together to form the unitary secure strippable extruded article described.

I claim.

1. A unitary extruded article having a stable, separable stripping portion for producing controlled fracturing in concrete masses comprising:

an extruded body having top and bottom portions formed from a thermoplastic resin and an intermediate portion forming a separable tear section between said top and bottom portions, and said intermediate portion being of a width substantially equal to that of the contiguous bottom and top portions and being formed of a thermoplastic resin having admixed therewith at least 150 parts per 100 parts of said thermoplastic resin of a tear strength reducing agent selected from the group consisting of a plasticizer for said thermoplastic resin and a filler whereby to permit the stripping of said top portion from said article, and said bottom portion having an elongated body and a plurality of projecting ribs on each side thereof, and extending longitudinally the length of said strip.

2. The concrete joint former article of claim 1 including the thickness of the intermediate section being between 0.01 and 0.125 inches.

3. The concrete joint former article of claim 1 including said bottom portion having a plurality of longitudinally extending ribs, each rib having upper and lower sloping surfaces converging outwardly.

4. The concrete joint former article of claim 1 including the tear strength reducing agent being a filler and being present in the amount of at least 200 parts per 100 parts of the thermoplastic resin.

5. The concrete joint former article of claim 1 including the tear strength reducing agent being a filler and being present in the amount of at least 400 parts per 100 parts of the thermoplastic.

6. The concrete joint former article of claim 1 including the tear strength of said intermediate strip being not greater than 48 lbs. per 9/32 inch thickness width as measured on a Chatillion scale and having a tensile strength of up to 509 lbs/square inch.

7. The concrete joint former article of claim 1 including the thickness of the intermediate section being between 0.01 and 0.125 inches and said bottom portion having a plurality of longitudinally extending ribs, each rib having upper and lower sloping surfaces converging outwardly.

8. The concrete joint former article of claim 1 including the thickness of the intermediate section being between 0.01 and 0.125 inches, said bottom portion having a plurality of longitudinally extending ribs, each rib having upper and lower sloping surfaces converging outwardly, and the tear strength of said intermediate strip being not greater than 48 lbs. per 9/32 inch thickness width as measured on a Chatillion scale and having a tensile strength of up to 509 lbs./square inch.

* * * * *